United States Patent Office 3,470,255
Patented Sept. 30, 1969

3,470,255
MANUFACTURE OF BIS(1,2,2-TRICHLOROETHYL) SULFIDE
Donald H. Kelly, Parkville, Mo., assignor to Chemagro Corporation, New York, N.Y., a corporation of New York
No Drawing. Filed Aug. 12, 1966, Ser. No. 571,965
Int. Cl. C07c 149/16, 149/10
U.S. Cl. 260—609 6 Claims

ABSTRACT OF THE DISCLOSURE

Bis(1,2,2-trichlorethyl) sulfiide is propared by reacting 1,2-dichloroethylene with 1,2,2-trichloroethanesulfenyl chloride in the presence of a chemical free radical addition initiator.

---

This invention relates to the preparation of bis(1,2,2-trichloroethyl) sulfide.

Bis(1,2,2-trichloroethyl) sulfide is an intermediate in the preparation of bis(1,2,2-trichloroethyl) sulfoxide, a valuable nematocide and fungicide as shown in Aichenegg Patent 3,249,495.

As pointed out in the Aichenegg patent col. 2, lines 7–16 and Examples 1 and 2 the sulfide is only obtained in poor yields and with undesired disulfide and other byproducts by use of a Friedel-Crafts catalyst and either reacting (1) sulfur dichloride with 1,2-dichloroethylene or (2) reacting 1,2,2-trichlorethyl sulfenyl chloride with cis or trans dichloroethylene.

In order to oxidize the crude sulfide to bis(1,2,2-trichloroethyl) sulfoxide and to get rid of the large amount of disulfide present strenuous oxidation conditions were necessary. These conditions caused significant breakdown of the sulfoxide formed and resulted in low yield and low quality bis(1,2,2-trichloroethyl) sulfoxide.

According to Pacine Patent 3,169,104 when 1 mole of sulfur dichloride and 1 mole of 1,2-dichloroethylene were irradiated with a mercury vapor lamp an oil was obtained that contained sulfur and chlorine to the extent expected for 1,2,2-trichloroethane sulfenyl chloride.

Attempts to follow the procedure of Pacine but using a 1:7 mole ratio of sulfur dichloride to 1,2-dichloroethylene using the mercury vapor lamp, followed by removal of the excess 1,2-dichloroethylene resulted in the formation of numerous compounds which gas liquid chromotography showed included little, if any, bis(1,2,2-trichloroethyl) sulfide.

Accordingly it is an object of the present invention to prepare bis(1,2,2-trichloroethyl) sulfide in improved yields.

Another object is to prepare bis(1,2,2-trichloroethyl) sulfide by a process which reduces the amount of byproduct.

A further object is to reduce the amount of bis(1,2,2-trichloroethyl) disulfide formed when forming bis(1,2,2-trichloroethyl )sulfide.

Still further objects and the entire scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by reacting 1,2,2-trichloroethyl sulfenyl chloride with 1,2-dichloroethylene in the presence of ultra violet light or a free radical initiator to obtain bis(1,2,2-trichloroethyl) sulfide in high yield and of good purity.

As used in the present claims the term "free radical addition" is intended to cover reaction initiated either by ultra violet light or a chemical free radical initiator.

Any convenient source of ultra violet light can be used such as a mercury vapor lamp or a Uviarc quartz vapor lamp providing light of wave length 2537° A.

As free radical initiators there can be used azo compounds including any of those described in Hunt Patent 2,471,959, e.g. azobis-isobutyronitrile, $\alpha,\alpha'$-azodicyclohexanecarbonitrile, azobis $\alpha,\gamma$-dimethyl valeronitrile, dimethyl-$\alpha,\alpha'$-azodiisobutyrate, $\alpha,\alpha'$-azodiisobutyramide, or peroxy compounds, e.g. peroxides, such as barium peroxide, sodium peroxide, and hydrogen peroxides or organic peroxides, e.g. benzoyl peroxide, p-chlorobenzoyl peroxide, methyl ethyl ketone peroxide, acetone peroxide, lauryl peroxide, stearyl peroxide, acetyl benzoyl peroxide, di-t-butyl peroxide, dicumyl peroxide, cumene hydroperoxide, acetyl peroxide, t-butyl hydroperoxide, triacetone peroxide, ethyl hydrogen peroxide, diethyl peroxide, di-$\alpha$-cumyl peroxide, t-butyl $\alpha$-cumyl peroxide; persulfates, e.g. sodium persulfate, potassium persulfate, ammonium persulfate; percarbonates, e.g. sodium percarbonate; perborates, e.g. sodium perborate; perchlorates, e.g. sodium perchlorate and potassium perchlorate; per esters, e.g. to t-butyl perbenzoate, di-t-butyl diperphthalate; organo metallic compounds, e.g. tetraethyl lead, tetramethyl lead, diethyl dimethyl lead, tin tetraphenyl, tributyl aluminum, dibutyl beryllium, etc.

Of course ultra violet light can be used simultaneously with the chemical free radical initiator.

Normally there is used at least a 10% molar excess of dichloroethylene for each mole of trichloroethanesulfenyl chloride although excess dichloroethylene is not necessary. There can be used 2, 5, 7, 8 or even 10 moles of dichloroethylene per mole of sulfenyl chloride but normally there is no advantage in employing such large excesses since more dichloroethylene must then be recovered.

By the process of the present invention crude yields of bis(1,2,2-trichloroethyl) sulfide have been obtained in amounts up to 96%. The product has good purity as shown by gas-liquid chromatography.

Unless otherwise indicated all parts and percentages are by weight.

When using the chemical free radical initiator it has been found desirable to use at least about 0.7% based on the weight of the sulfenyl chloride. With azobis-isobutyronitrile it has been found that 1.7 grams to 1 mole of sulfenyl chloride gives good results. The upper limit on the amount of initiator is not critical. Simply on a basis of economics, however, it is rare that over 2% of initiator based on the sulfenyl chloride would be employed. The byproduct of the initiator generally can be removed by the normal work-up procedure employed in the process.

Example 1

A typical ultra violet light reaction was carried out by irradiating a solution of 1 mole of 1,2,2-trichloroethanesulfenyl chloride in 5 moles of 1,2-dichloroethylene with a mercury vapor lamp at room temperature. After 24 hours the excess dichloroethylene was removed by distillation and the residual oil (92–100% crude yield) was analyzed by gas-liquid chromatograph to be 70–80% bis(1,2,2-trichloroethyl) sulfide. The pure product may be recovered by distillation in a vacuum (below 1 mm. Hg).

Example 2

A free radical initiated reaction was carried out by refluxing a solution of 2 moles of 1,2-dichloroethylene, 1 mole of 1,2,2-trichloroethanesulfenyl chloride and 1.7 grams of 2,2′azobis(2-methylpropionitrile). After 24 hours the excess dichloroethylene was removed and the residual oil (95–100% crude yield) was analyzed by gas-liquid chromatography to be 75–82% bis(1,2,2-trichloroethyl) sulfide. The pure product can be obtained by vacuum distillation at below 1 mm.

Example 3

A solution of 1 mole of 1,2,2-trichloroethanesulfenyl chloride, 1.10 mole of 1,2-dichloroethylene and 1.7 grams of 2,2′-azobis(2-methylpropionitrile) was heated at 80–90° C. for 32 hours. The product was then stripped under vacuum at 45–55° C. to remove volatile impurities to give 92% crude bis(1,2,2-trichloroethyl) sulfide with similar purity as above examples. This reaction also was successfully carried out with a 1:1 mole ratio of dichloroethylene to sulfenyl chloride.

Employment of cis or trans 1,2-dichloroethylene had no appreciable effect on the rate of the addition. In the specific examples there was employed the isomeric mixture. However, when the 1,2,2-trichloroethanesulfenyl chloride contained an impurity that showed up as having a high $R_F$ on thin layer chromatography, the addition rate appeared to be retarded considerably.

Under optimum conditions, the reaction was over 95% complete in the first three hours.

What is claimed is:

1. A process of preparing bis(1,2,2-trichloroethyl) sulfide comprising reacting 1,2-dichloroethylene with 1,2,2-trichloroethanesulfenyl chloride in the presence of a chemical free radical addition initiator.

2. A process according to claim 1 wherein an excess of 1,2-dichloroethylene is used on a molar basis.

3. A process according to claim 2 wherein the catalyst is 2,2′-azobis(2-methylpropionitrile).

4. A process according to claim 2 wherein at least 1 mole of 1,2-dichloroethylene is employed per mole of 1,2,2-trichloroethanesulfenyl chloride.

5. A process according to claim 4 wherein the excess dichloroethylene is removed by distillation.

6. A process according to claim 4 wherein 1.1 to 5 moles of 1,2-dichloroethylene are employed per mole of 1,2,2-trichloroethanesulfenyl chloride.

References Cited

UNITED STATES PATENTS

| | | | |
|---|---|---|---|
| 3,287,417 | 11/1966 | Bender et al. | 204—158 X |
| 3,290,380 | 12/1966 | Aichenegg et al. | 260—609 |

HOWARD S. WILLIAMS, Primary Examiner

U.S. Cl. X.R.

204—158